United States Patent
Jeon et al.

(10) Patent No.: US 10,185,510 B2
(45) Date of Patent: Jan. 22, 2019

(54) BANK INTERLEAVING CONTROLLER AND SEMICONDUCTOR DEVICE INCLUDING THE SAME

(71) Applicant: SK hynix Inc., Icheon-si Gyeonggi-do (KR)

(72) Inventors: Seon Kwang Jeon, Yongin-si Gyeonggi-do (KR); Bo Ra Choi, Seoul (KR)

(73) Assignee: SK hynix Inc., Icheon-si, Gyeonggi-do (KR)

( * ) Notice: Subject to any disclaimer, the term of this patent is extended or adjusted under 35 U.S.C. 154(b) by 310 days.

(21) Appl. No.: 15/334,421

(22) Filed: Oct. 26, 2016

(65) Prior Publication Data

US 2017/0329547 A1 Nov. 16, 2017

(30) Foreign Application Priority Data

May 13, 2016 (KR) .................. 10-2016-0058867

(51) Int. Cl.
| | |
|---|---|
| G11C 5/14 | (2006.01) |
| G06F 3/06 | (2006.01) |
| G06F 12/06 | (2006.01) |
| G06F 1/32 | (2006.01) |

(52) U.S. Cl.
CPC .............. *G06F 3/0625* (2013.01); *G06F 1/32* (2013.01); *G06F 3/0653* (2013.01); *G06F 3/0658* (2013.01); *G06F 3/0673* (2013.01); *G06F 12/0607* (2013.01); *G06F 2212/1028* (2013.01)

(58) Field of Classification Search
CPC ....... G11C 7/1042; G11C 16/10; G11C 7/109; G11C 13/0023
See application file for complete search history.

(56) References Cited

U.S. PATENT DOCUMENTS

| | | | |
|---|---|---|---|
| 9,182,916 B1 | 11/2015 | Horn | |
| 2008/0219047 A1 | 9/2008 | Yu et al. | |
| 2012/0059983 A1* | 3/2012 | Nellans | ............... G06F 12/0215 711/105 |
| 2018/0059977 A1* | 3/2018 | Matsuyama | .......... G06F 3/0625 |

FOREIGN PATENT DOCUMENTS

KR 100819061 B1 4/2008

* cited by examiner

*Primary Examiner* — Tuan T Nguyen
(74) *Attorney, Agent, or Firm* — William Park & Associates Ltd.

(57) ABSTRACT

A bank interleaving controller may include a power calculator and a write driver. The power calculator may calculate a total power consumption by adding a power consumption of one or more memory banks that are performing write operations and an amount of power that is expected to be additionally consumed to write input data. The write driver may write the input data to a memory cell corresponding to an input address when the total power consumption is equal to or less than a reference power consumption.

20 Claims, 4 Drawing Sheets

BANK INTERLEAVING CONTROLLER AND SEMICONDUCTOR DEVICE INCLUDING THE SAME

CROSS-REFERENCES TO RELATED APPLICATION

The present application claims priority under 35 U.S.C. § 119(a) to Korean application number 10-2016-0058867 filed on May 13, 2016, in the Korean Intellectual Property Office, which is incorporated herein by reference in its entirety.

BACKGROUND

1. Technical Field

Various embodiments generally relate to a bank interleaving controller and a semiconductor device including the same, and more particularly to a bank interleaving controller capable of controlling a number of available banks based on power consumption, and a semiconductor device including the same.

2. Related Art

Recently, more and more systems use a large amount of data in order to process images or big data. In order to process a large amount of data, it is important to not only increase memory capacity, but also achieve higher data processing speed.

Examples of methods that are used to achieve higher data processing speed at a memory may include bank interleaving techniques. Bank interleaving techniques refers to techniques for controlling data to use a plurality of banks at the same time. Thus, bank interleaving techniques can improve the data processing speed compared to memory devices that do not use the bank interleaving techniques.

In the bank interleaving techniques, however, accessing a plurality of banks at the same time may increase power consumption.

SUMMARY

In an embodiment of the present disclosure, a bank interleaving controller may include a power calculator and a write driver. The power calculator may calculate a total power consumption by adding a power consumption of one or more memory banks that are performing write operations and an amount of that is expected to be additionally consumed to write input data. The write driver may write the input data to a memory cell corresponding to an input address when the total power consumption is equal to or less than a reference power consumption.

In an embodiment of the present disclosure, a semiconductor device may include a memory cell array and a bank interleaving controller. The memory cell array may be divided into a plurality of banks. The bank interleaving controller may store data in the plurality of banks. The bank interleaving controller may include a power calculator and a write driver. The power calculator may calculate a total power consumption by adding a power consumption of one or more banks that are performing write operations and an amount of power that is expected to be additionally consumed to write input data. The write driver may write the input data to a memory cell corresponding to an input address when the total power consumption is equal to or less than a reference power consumption.

BRIEF DESCRIPTION OF THE DRAWINGS

Features, aspects, and embodiments are described in conjunction with the attached drawings, in which.

DETAILED DESCRIPTION

Hereinafter, a bank interleaving controller and a semiconductor device including the same according to example embodiments of the present disclosure will be described below with reference to the accompanying drawings.

In order to reduce a power consumption during bank interleaving, a number of banks that can be used during bank interleaving may be limited. For example, the number of memory banks that can be used during bank interleaving may be limited to a certain number.

Figure 1:
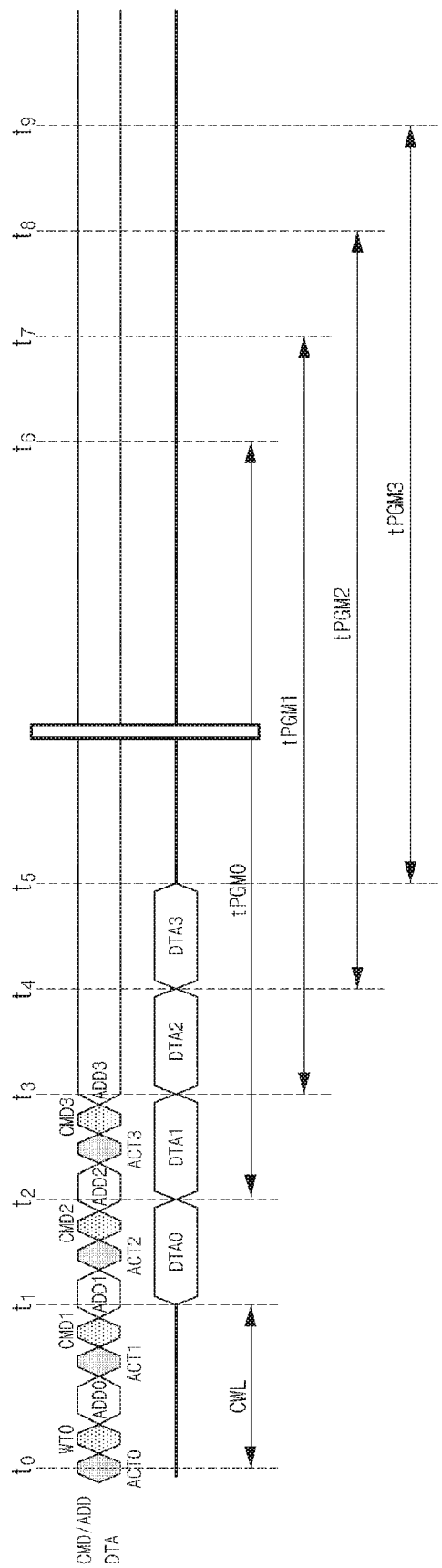
FIG. 1 is a timing chart illustrating an example of a data flow during bank interleaving.

FIG. 1 illustrates an example of a data flow during bank interleaving. In FIG. 1, it is assumed that the number of banks that can be used during bank interleaving is limited to four (4).

Referring to FIG. 1, an active command ACT0, a write command WT0, and an address ADD0, which are provided for a first bank, an active command ACT1, a write command WT1, and an address ADD1, which are provided for a second bank, an active command ACT2, a write command WT2, and an address ADD2, which are provided for a third bank, and an active command ACT3, a write command WT3, and an address ADD0, which are provided for a fourth bank, may be sequentially inputted through command/address pins of a memory.

Through data pins of the memory, data DTA0 for the first bank, data DTA1 for the second bank, data DTA2 for the third bank and data DTA3 for the fourth bank may be sequentially input at a first time point t1 when CAS Write Latency (CWL) has elapsed since command and address signals started to be transmitted through the command/address pins.

The memory may write the data DTA0 to DTA3 to memory cells of the respective banks corresponding to the addresses ADD0 to ADD3. Specifically, the data DTA0 may be written to the address ADD0 of the first bank, the data DTA1 may be written to the address ADD1 of the second bank, the data DTA2 may be written to the address ADD2 of the third bank, and the data DTA3 may be written to the address ADD3 of the fourth bank.

Here, a program time tPGM may be a time it takes to write the data DTA0 to DTA3 to the memory cells corresponding to the addresses ADD0 to ADD3 of the first to fourth banks. That is, the write operation for the data DAT0 to be written to the memory cells corresponding to the address ADD0 of the first bank may be started at a second time point t2, and may be ended at a sixth time point t6 when the program time tPGM has elapsed. The write operation for the data DAT1 to the address ADD1 of the second bank may be started at a third time point t3 and ended at a seventh time point t7 when the program time tPGM has elapsed. The write operation for the data DAT2 to the address ADD2 of the third bank may be started at a fourth time point t4 and ended at an eighth time point t8 when the program time tPGM has elapsed. The write operation for the data DAT3 to the address ADD3 of the fourth bank may be started at a fifth time point t5 and ended at a time point t9 when the program time tPGM has elapsed.

Thus, since the write operations for the first to fourth banks are all performed during the period from the fifth time point t5 to the sixth time point t6, a power consumption during this period of time may be increased. Therefore, the number of banks that can be used during bank interleaving may be limited to limit the power consumption.

However, even if a large number of banks are being used, current consumption may not be so high depending on condition of data. For example, suppose that data "11111111" are stored in memory cells corresponding to the address ADD0 of the first bank. In this case, when new command, address and data signals are input to write the same data "11111111" to the same memory cells corresponding to the address ADD0 of the first bank, the data do not need to be written. Therefore, the first bank consumes only a slight amount of power to compare the data, but consumes no power to write the data. Thus, this saved power can be used to perform another write operation with respect to different banks. However, if the number of banks that can be used during bank interleaving is limited regardless of available power, the number of banks may be limited even if the saved power is high enough to perform additional write operations to additional banks, and as a result it may be difficult to improve the processing speed of the memory.

In an embodiment, however, a bank interleaving controller may compare data bit values stored in a memory to data bit values of input data so that additional write operations can be performed when the power required for performing additional write operation is below a reference value.

Figure 2:
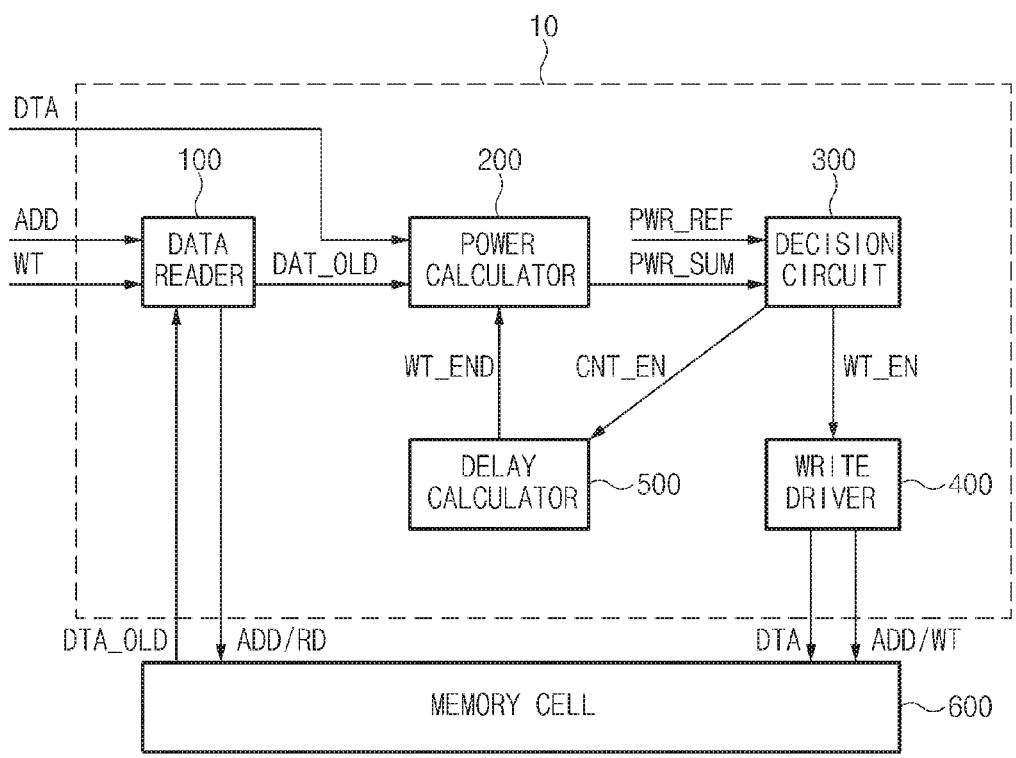
FIG. 2 is a configuration diagram illustrating an example of a bank interleaving controller according to an embodiment.

FIG. 2 is a configuration diagram illustrating an example of a bank interleaving controller 10 according to an embodiment.

Referring to FIG. 2, the bank interleaving controller 10 may include a data reader 100, a power calculator 200, a decision circuit 300, a write driver 400, and a delay calculator 500.

The data reader 100 may access a memory cell 600 corresponding to an address ADD input with a write command WT, and may read data DTA_OLD already stored in the memory cell 600. That is, the data reader 100 may transmit the input address ADD to the memory cell 600, and may receive, from the memory cell 600, the data DTA_OLD stored in the memory cell 600 corresponding to the input address ADD.

The power calculator 200 may calculate an amount of power required for storing input data DTA in the memory cell 600 corresponding to the input address ADD. In an embodiment, the data bits of the previously stored data DTA_OLD may be compared to the data bits of the input data DTA, respectively, and a write operation may be performed only on changed bits when writing the input data DTA.

For example, where data bits of the previously stored data DTA_OLD are "10101010," if data bits of the input data DTA are "10100111," the first bit (i.e., the least significant bit) may be changed from "0" to "1," the third bit may be changed from "0" to "1," and the fourth bit may be changed from "1" to "0." Since the other data bits (i.e., the second bit, the fifth bit, the sixth bit, the seventh bit and the eight bit) are identical to those of the previous data, these data bits may be retained.

Here, the power consumed when the data bit of each memory cell 600 is changed from "0" to "1" may be different from the power consumed when the data bit of each memory cell 600 is changed from "1" to "0." Thus, in order to calculate the power consumption, the power calculator 200 may apply different weights depending on whether the data bit is changed from "0" to "1" or from "1" to "0."

A Phase Change Random Access Memory (hereinafter referred to as "PCRAM") may be a device that writes data by changing the resistance across a phase-change material therein. A phase of the phase-change material may be changed from a crystalline state to an amorphous state depending on temperature variation. A material has a lower resistance when it is in the crystalline state than when it is in the amorphous state because constituents of the crystalline-state materials are arranged in an ordered lattice structure. When the PCRAM is changed from the amorphous state to the crystalline state, the power consumption is about four times larger than when the PCRAM is changed from the crystalline state to the amorphous state. Thus, where the PCRAM is used as the memory cell 600, the power consumption in the operation of changing a state of a memory cell from data "1" state to data "0" state may be four times larger than the power consumption in the operation of changing a state of a memory cell from data "0" state to data "1" state if the data "0" state is the crystalline state and the data "1" is the amorphous state. Alternatively, the power consumption in the operation of changing a state of a memory cell from data "0" state to data "1" state may be four times larger than the power consumption in the operation of changing data from data "1" state to data "0" state if the data "1" state is the crystalline state and the data "0" is the amorphous state.

The power calculator 200 may calculate a total power consumption PWR_SUM by adding the power consumption calculated (estimated) based on the input data and the power consumption of the bank in which the write operation is currently performed. If there is a previously calculated total power consumption when the input data is input, the power calculator 200 may add the power consumption of the input data to the previously calculated total power consumption, in order to calculate the total power consumption PWR_SUM. The initial value of the total power consumption may be set to zero (0).

The decision circuit 300 may determine whether the total power consumption PWR_SUM calculated through the power calculator 200 is larger than a reference power consumption PWR_REF. At this time, the reference power consumption PWR_REF may be set to the maximum available power consumption value.

For example, where a memory module has a page that includes 128 bits and nine packages are included in each Dual In-line Memory Module (DIMM), if all data bits have "1" and four active commands ACT may be input during the program time tPGM required for writing the data, the maximum power consumption value may be calculated as follows.

4(weight)*128(page size)*9(number of packages per DIMM)*4(number of active commands within tPGM)=18,432

The above expression is only an example, and may be set in various manners according to the capacity of the memory.

The decision circuit 300 may enable a write enable signal WT_EN when the total power consumption PWR_SUM is smaller than the reference power consumption PWR_REF. Furthermore, in order to enable a counter indicating that a write operation for the input data is being performed, the decision circuit 300 may enable a counter enable signal CNT_EN.

When the write enable signal WT_EN is enabled by the decision circuit 300, the write driver 400 may write the input data DTA to a memory cell corresponding to an input address ADD. Here, each bit of previously stored data DTA_OLD stored in the memory cell is compared with each bit of the input data, and the write operation may be performed, among bits of the input data DTA, only on bits that change from "1" to "0" or from "0" to "1".

The delay calculator 500 may check whether a write operation is being performed in each bank. For example, the delay calculator 500 may include a counter that operates during the program time tPGM for each bank. For example, each bank may have its own counter. Here, the program time tPGM for a certain bank may be a time it takes to write data to the certain bank. Furthermore, the delay calculator 500 may receive the counter enable signal CNT_EN from the decision circuit 300, and may start operating the counter for a corresponding bank. Each counter may transmit a write end signal WT_EN to the power calculator 200 when the program time tPGM (refer to FIG. 1) has elapsed since the operation of the counter started. Since write operations start sequentially in the order in which data bits are input, the bank that received data first may finish its write operation first.

A write end signal WT_END may indicate that the program time tPGM for a bank that received data first has elapsed. When the write end signal WT_END is input from the delay calculator 500, the power calculator 200 may subtract a power consumption value of a bank that has finished its write operation, from the total power consumption PWR_SUM. That is, when a data write operation for any bank is ended, the power calculator 200 may calculate (update) the total power consumption PWR_SUM by subtracting the power consumption of the bank that finished its write operation.

The decision circuit 300 may determine whether the total power consumption PWR_SUM updated through the power calculator 200 exceeds the reference power consumption PWR_REF. When the total power consumption PWR_SUM does not exceed the reference power consumption PWR_REF, the write driver 400 may write the input data DTA to the memory cells corresponding to the input address ADD. When the total power consumption PWR_SUM exceeds the reference power consumption PWR_REF, the delay calculator 500 may wait until a write operation for one of the banks that are performing write operations finishes its write operation. Even in this case, the bank that receives data first may finish its write operation first.

In an embodiment, the bank interleaving controller may calculate an amount of power used for write operations and determine whether the power required for additionally writing data to an additional bank exceeds the reference value. Thus, since the number of banks that can be used during bank interleaving is flexible, the bank interleaving controller can expand a write bandwidth.

Hereafter, a data flow when the above-described bank interleaving controller is used will be described.

Figure 3:
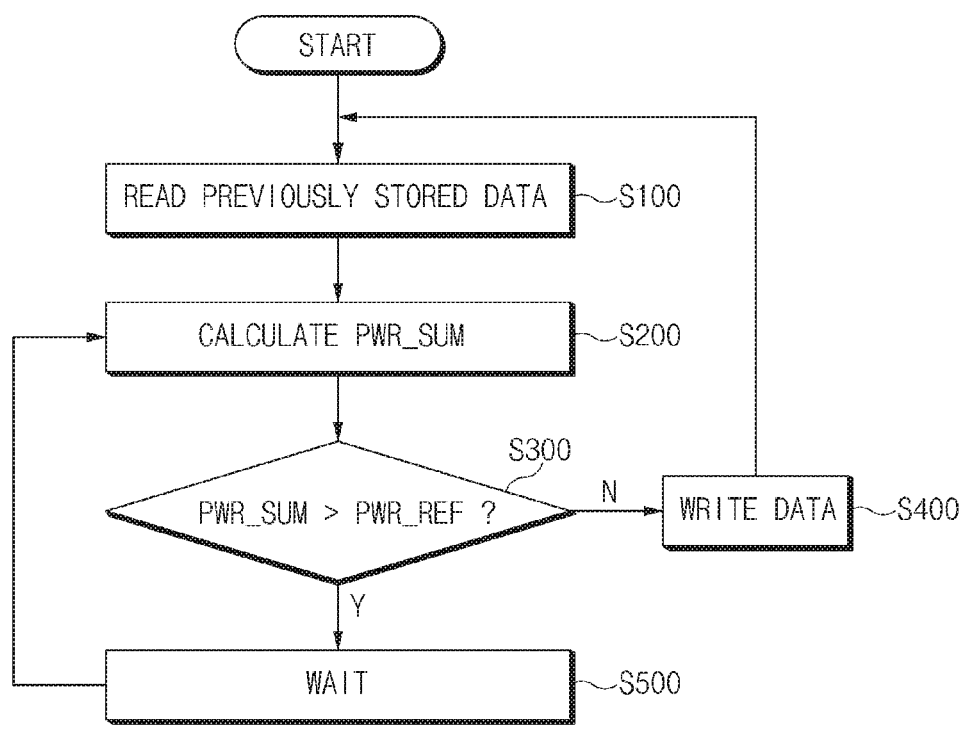
FIG. 3 is a flowchart illustrating an example of a data flow according to an embodiment.

FIG. 3 is a flowchart illustrating an example of a data flow according to an embodiment.

Referring to FIG. 3, a bank interleaving control by the bank interleaving controller 10 may be started as a write command WT, an address ADD and data DTA are input.

The data reader 100 may read data DTA_OLD which are previously stored at the input address ADD (step S100).

The power calculator 200 may calculate total power consumption PWR_SUM (step S200). For example, the power calculator 200 may compare the data bits of the input data DTA and data bits the previously stored data DTA_OLD, respectively, and may calculate an amount of power consumed when a write operation is performed only on changed bits. Here, the power consumed during the write operation of changing data from "0" to "1" may be different from the power consumed during the write operation of changing data from "1" to "0." The power calculator 200 may add the calculated power consumption to the previous total power consumption PWR_SUM, in order to calculate the total power consumption PWR_SUM for the input data DTA.

The decision circuit 300 may determine whether the total power consumption PWR_SUM calculated by the power calculator 200 exceeds the reference power consumption PWR_REF (step S300). When the total power consumption PWR_SUM does not exceed the reference power consumption PWR_REF, the decision circuit 300 may enable the write enable signal WT_EN for the write driver 400. When the total power consumption PWR_SUM exceeds the reference power consumption PWR_REF, the decision circuit 300 may enable the counter enable signal CNT_EN for the delay calculator 500.

When the write enable signal WT_EN for the write driver 400 is enabled because the total power consumption PWR_SUM does not exceed the reference power consumption PWR_REF at step S300 (N), the write driver 400 may transmit the input write command WT, the input address ADD and the input data DTA to the memory cell 600 to perform a write operation (step S400), and then the bank interleaving controller may wait for an input of the next data.

When the counter enable signal CNT_EN for the delay calculator 500 is enabled because the total power consumption PWR_SUM exceeds the reference power consumption PWR_REF at step S300 (Y), the delay calculator 500 may wait until the write operation for the bank which received data first is ended, among banks performing a write operation (step S500).

A waiting time may be determined by using a counter. Specifically, the operation of the counter may be started when a write operation is started, and the counter may be operated during the program time tPGM. Such a counter may be installed in each of the banks, and may check whether a write operation for the bank has been performed.

When the write operation for the bank which received data first is ended, the power calculator 200 may recalculate the total power consumption. That is, since the write operation for the bank which received data first has been ended, the power calculator 200 may recalculate the total power PWR_SUM by subtracting the power consumed during the write operation performed on the bank which received data first, from the previously calculated total power (step S200). Subsequently, the decision circuit 300 may determine whether the calculated total power consumption PWR_SUM is smaller than the reference power consumption PWR_REF (step S300).

In this way, the bank interleaving controller 10 may wait until the write operation currently being performed is ended, until the total power consumption PWR_SUM becomes smaller than the reference power consumption PWR_REF. That is, the bank interleaving controller 10 may repeat steps S200, S300 and S500, until the total power consumption PWR_SUM becomes smaller than the reference power consumption PWR_REF.

In an embodiment, the bank interleaving controller may calculate power required for writing changed bits and determine whether the total power consumption PWR_SUM used to write data to a bank exceeds the reference value PWR_REF. Thus, as long as the total power consumption PWR_REF falls within the range of the reference power consumption PWR_REF, the number of banks that can be used during bank interleaving may increase. Thus, the write bandwidth can be expanded.

Figure 4:
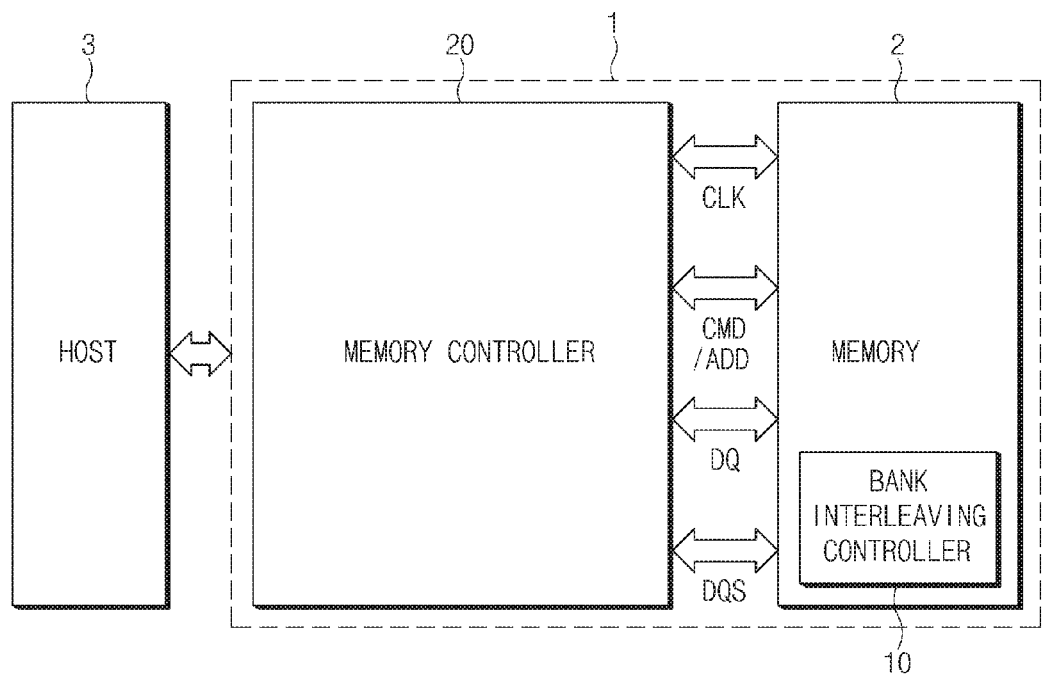
FIG. 4 is a configuration diagram illustrating an example of a semiconductor system according to an embodiment.

FIG. 4 is a configuration diagram illustrating an example of a semiconductor system including the bank interleaving controller 10 according to an embodiment.

As illustrated in FIG. 4, the semiconductor system may include a host 3 and a semiconductor device 1, and the semiconductor device 1 may include a memory controller 20 and a memory 2.

The host 3 may transmit a request and data to the memory controller 20 to access the memory 2. The host 3 may transmit the data to the memory controller 20 to store the data in the memory 2. Furthermore, the host 3 may receive data from the memory 2 through the memory controller 20. The memory controller 20 may provide data information, address information, memory setting information, a write request and a read request to the memory 2 in response to the request, and may control the memory 2 to perform a write or read operation. The memory controller 20 may relay communication between the host 3 and the memory 2. The memory controller 20 may receive a request and data from the host 3. The memory controller 20 may generate data DQ, a data strobe signal DQS, a command signal CMD, a memory address ADD and a clock CLK, and may provide the data DQ, the data strobe signal DQS, the command signal CMD, the memory address ADD and the clock CLK to the memory 2 to control the operation of the memory 2. The memory controller 20 may provide the data DQ and the data strobe signal DQS, which are output from the memory 2, to the host 3. The data DQ and the data strobe signal DQS may correspond to the data DTA of FIGS. 1 and 2.

The memory 2 may include the bank interleaving controller 10 in accordance with an embodiment. Thus, when a write command and a memory address signal ADD are input from the memory controller 20, the bank interleaving controller 10 may calculate estimated power consumption of a bank corresponding to the address, and determine whether estimated total power consumption PWR_SUM is equal to or less than reference power consumption PWR_REF. When the total power consumption PWR_SUM is equal to or less than the reference power consumption PWR_REF, the bank interleaving controller 10 may perform a write operation for the input data DTA. When the total power consumption PWR_SUM exceeds the reference power consumption PWR_REF, the bank interleaving controller 10 may wait until a write operation that is currently being performed is ended, and may recalculate the total power consumption PWR_SUM to determine whether the total power consumption PWR_SUM exceeds the reference power consumption PWR_REF. In this way, the bank interleaving controller 10 may control bank interleaving such that the write operation for the input data DTA is performed in a range that does not exceed the reference power consumption PWR_REF.

FIG. 4 illustrates that the bank interleaving controller 10 is included in the memory 2, but the bank interleaving controller 10 may be positioned in the memory controller 20.

FIG. 4 illustrates that the host 3 and the memory controller 20 are physically separated from each other. However, the memory controller 20 may be included (embedded) in a processor such as a CPU of the host 3, an application processor (AP) or a graphic processing unit (GPU), or may be implemented in the form of System on Chip (SoC) as one chip with the processors.

The memory 2 may include one or more access detectors 100. The memory 2 may receive a command CMD, a memory address signal ADD, data DQ, a data strobe signal DQS and a clock signal CLK from the memory controller 20, and may receive data signals based on the signals.

The memory 2 may include a plurality of memory banks, and may store the data DQ in a specific bank, among the banks of the memory, based on the memory address signal ADD. Furthermore, the memory 2 may transmit data based on the command CMD, the memory address signal ADD, and the data strobe signal DQS, which are received from the memory controller 20. The memory 2 may transmit data stored in a specific bank, among the banks of the memory to the memory controller 20, based on the memory address signal ADD, the data DQ, and the data strobe signal DQS.

According to an embodiment, since the number of banks that can be used during bank interleaving is flexible so long as the total power consumption is maintained within the range of the reference power consumption, the bank interleaving controller and the semiconductor device can expand the write bandwidth.

While certain embodiments have been described above, it will be understood to those skilled in the art that the embodiments described are by way of example only. Accordingly, the semiconductor device described herein should not be limited based on the described embodiments. Rather, the semiconductor device described herein should only be limited in light of the claims that follow when taken in conjunction with the above description and accompanying drawings.

What is claimed is:

1. A bank interleaving controller comprising:
a power calculator configured to calculate a total power consumption by adding a power consumption of one or more memory banks that are performing write operations and an amount of power that is expected to be additionally consumed to write input data; and
a write driver configured to write the input data to a memory cell corresponding to an input address when the total power consumption is equal to or less than a reference power consumption.

2. The bank interleaving controller according to claim 1, wherein the power calculator compares data bits of the input data to corresponding data bits of old data previously stored in the memory cell corresponding to the input address, and calculates an amount of power expected to be consumed when a write operation is performed only on data bits that are different from those of the old data to obtain the amount of power that is expected to be additionally consumed.

3. The bank interleaving controller according to claim 2, wherein the write driver performs a write operation only on the data bits that are different from those of the old data, among the bits of the input data.

4. The bank interleaving controller according to claim 2, further comprising a data reader configured to read the old data stored in the memory cell corresponding to the input address.

5. The bank interleaving controller according to claim 1, further comprising a decision circuit configured to determine whether the total power consumption is equal to or less than the reference power consumption.

6. The bank interleaving controller according to claim 5, wherein the decision circuit enables a write enable signal when the total power consumption is equal to or less than the reference power consumption.

7. The bank interleaving controller according to claim 6, wherein the write driver writes the input data to the memory cell corresponding to the input address in response to the write enable signal.

8. The bank interleaving controller according to claim 1, further comprising a delay calculator configured to calculate a point in time when the write operation of the memory bank that started the write operation first is ended, among the one or more memory banks that are performing their write operations, when the total power consumption is larger than the reference power consumption.

9. The bank interleaving controller according to claim 8, wherein the power calculator waits until the point in time calculated by the delay calculator, and then updates the total power consumption by subtracting a power consumption of the memory bank that has completed its write operation from the total power consumption.

10. The bank interleaving controller according to claim 9, wherein the write driver writes the input data to the memory cell corresponding to the input address when the updated total power consumption is equal to or smaller than the reference power consumption.

11. A semiconductor device comprising:
a memory cell array divided into a plurality of banks; and
a bank interleaving controller configured to store data in the plurality of banks,
wherein the bank interleaving controller comprises:
a power calculator configured to calculate a total power consumption by adding a power consumption of one or more banks that are performing write operations and an amount of power that is expected to be additionally consumed to write input data; and
a write driver configured to write the input data to a memory cell corresponding to an input address when the total power consumption is equal to or less than a reference power consumption.

12. The semiconductor device according to claim 11, wherein the power calculator compares data bits of the input data to corresponding data bits of old data previously stored in the memory cell corresponding to the input address, and calculates an amount of power expected to be consumed when a write operation is performed only on data bits that are different from those of the old data to obtain the amount of power that is expected to be additionally consumed.

13. The semiconductor device according to claim 12, wherein the write driver performs a write operation only on the data bits that are different from those of the old data, among the bits of the input data.

14. The semiconductor device according to claim 11, wherein the bank interleaving controller further comprises a data reader configured to read the old data stored in the memory cell corresponding to the input address.

15. The semiconductor device according to claim 11, wherein the bank interleaving controller further comprises a decision circuit configured to decide whether the total power consumption is equal to or less than the reference power consumption.

16. The semiconductor device according to claim 15, wherein the decision circuit enables a write enable signal when the total power consumption is equal to or less than the reference power consumption.

17. The semiconductor device according to claim 16, wherein the write driver writes the input data to the memory cell corresponding to the input address in response to the write enable signal.

18. The semiconductor device according to claim 11, wherein the bank interleaving controller further comprises a delay calculator configured to calculate a point in time when the write operation of the bank that started the write operation first, among the one or more banks that are performing their write operations, when the total power consumption is larger than the reference power consumption.

19. The semiconductor device according to claim 18, wherein the power calculator waits until the point in time calculated by the delay calculator, and then updates the total power consumption by subtracting a power consumption of the bank that has completed its write operation from the total power consumption.

20. The semiconductor device according to claim 19, wherein when the write driver writes the input data to the memory cell corresponding to the input address when the updated total power consumption is equal to or smaller than the reference power consumption.

* * * * *